No. 863,042. PATENTED AUG. 13, 1907.
W. PELTIER.
SHOCK LOADER.
APPLICATION FILED JAN. 14, 1907.
3 SHEETS—SHEET 1.
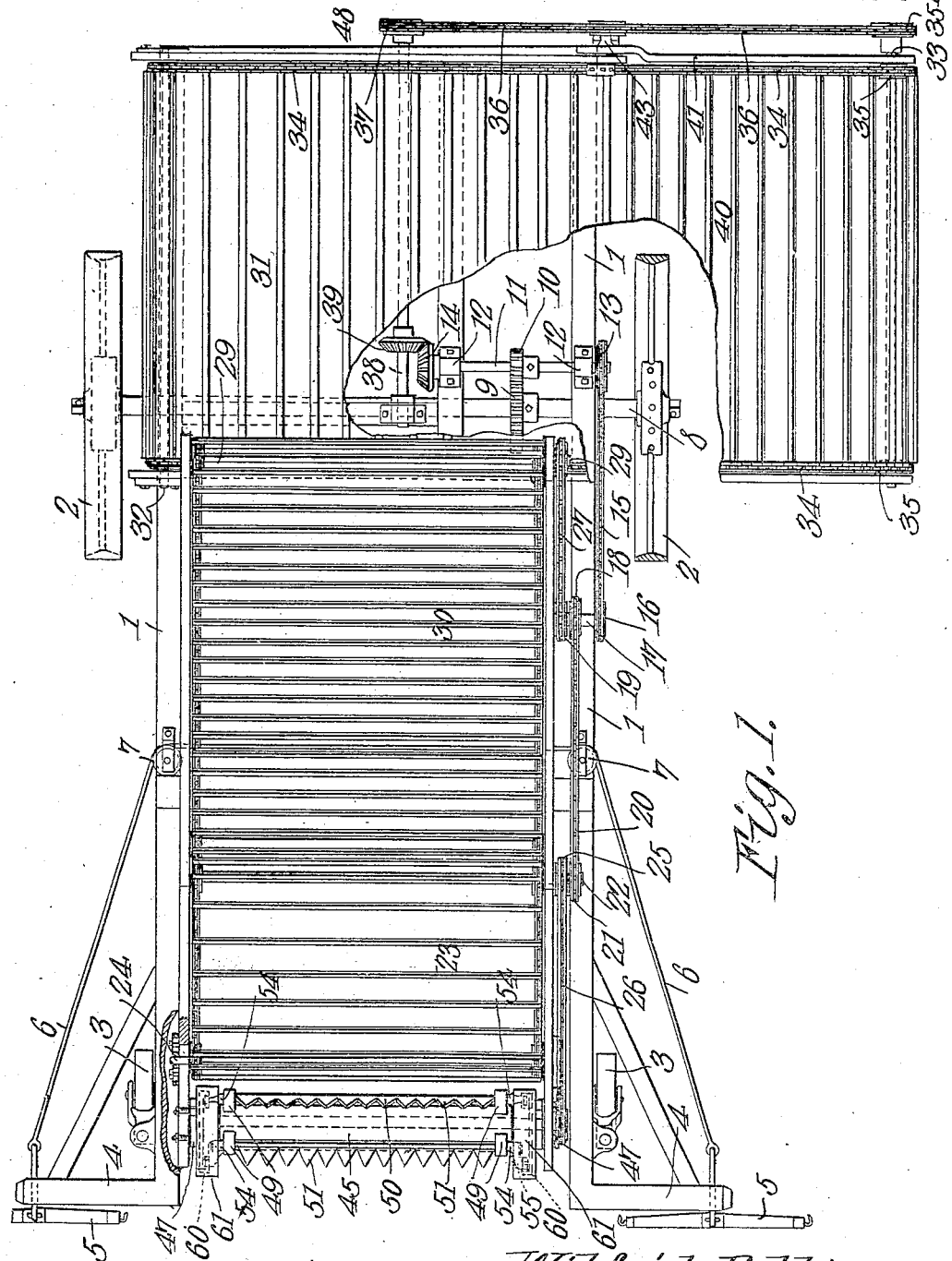
WITNESSES:
Wilfrid Peltier,
INVENTOR
By C.A.Snow&Co
ATTORNEYS

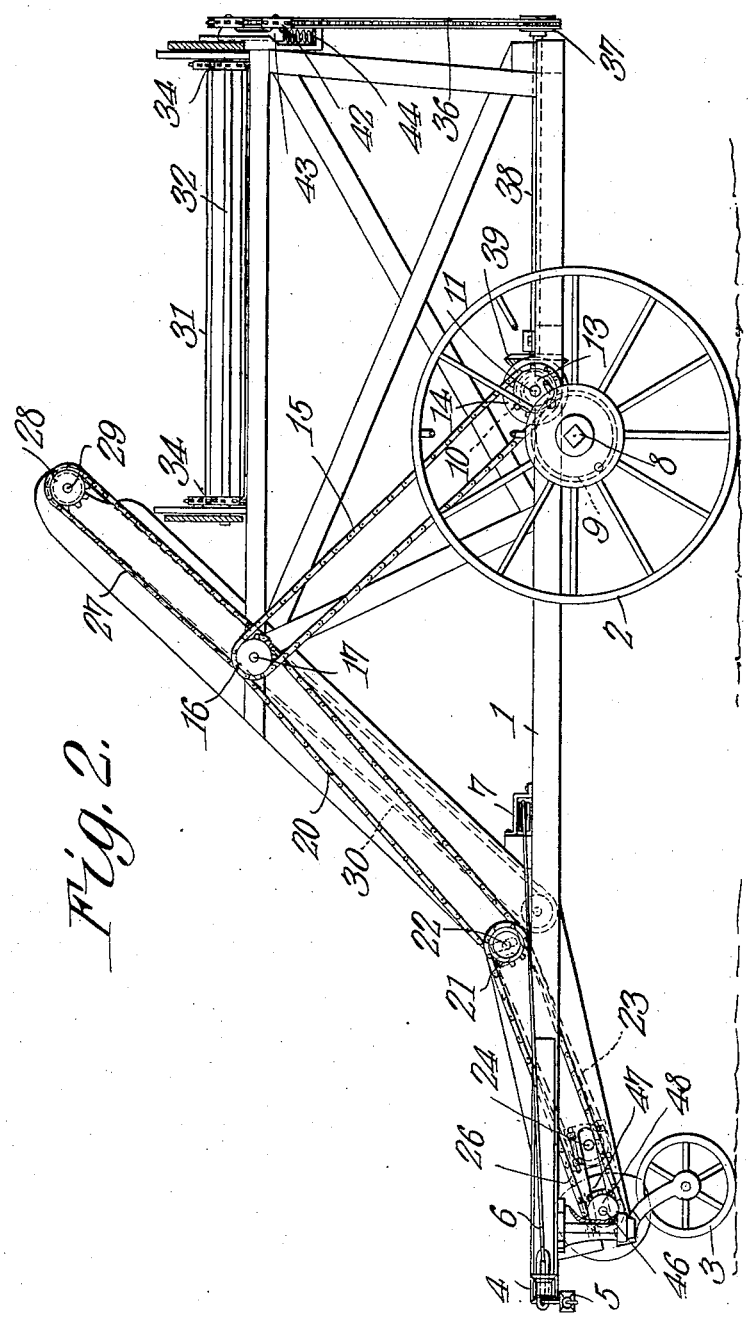

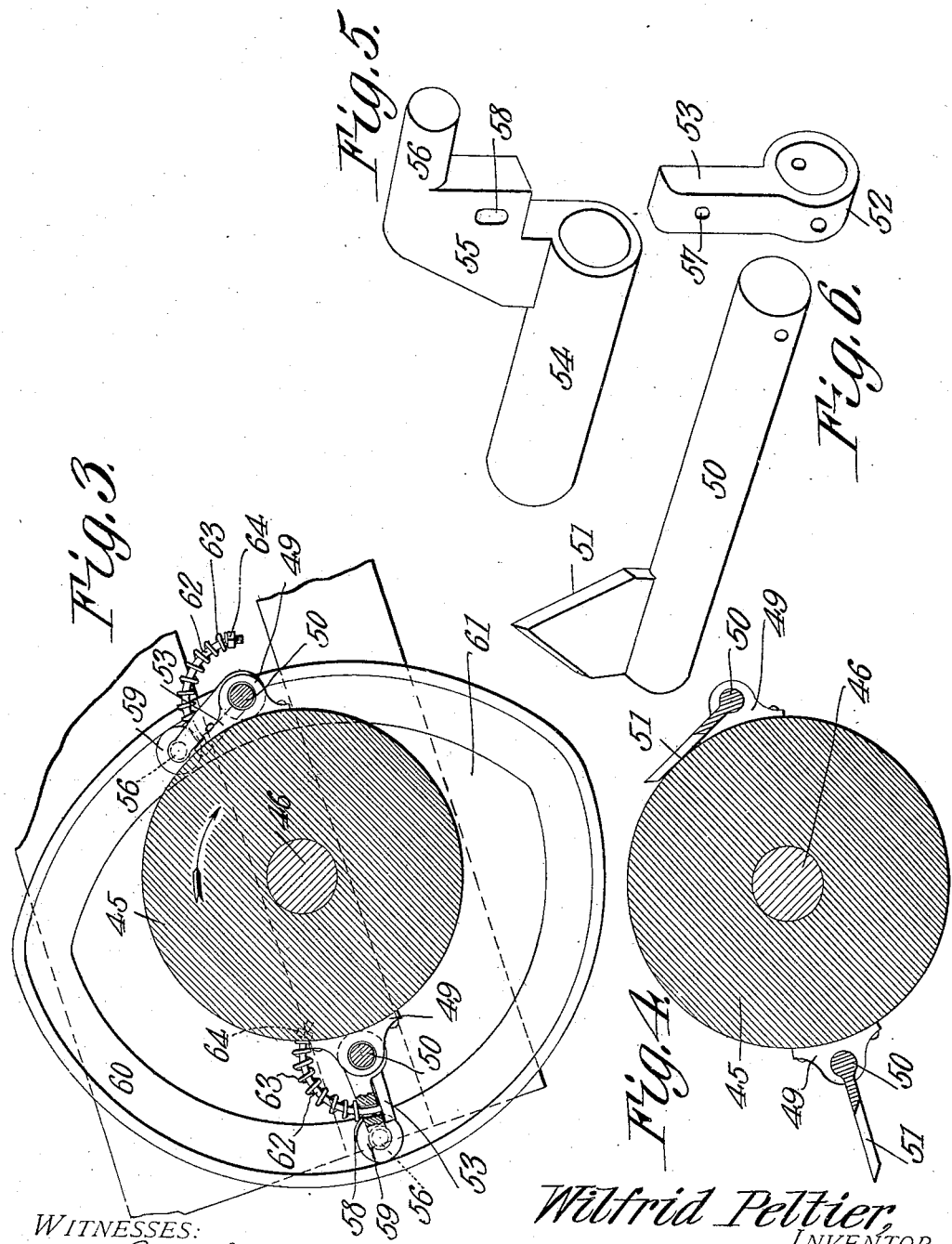

UNITED STATES PATENT OFFICE.

WILFRID PELTIER, OF CONCORDIA, KANSAS.

SHOCK-LOADER.

No. 863,042.  Specification of Letters Patent.  Patented Aug. 13, 1907.

Application filed January 14, 1907. Serial No. 352,253.

*To all whom it may concern:*

Be it known that I, WILFRID PELTIER, a citizen of the United States, residing at Concordia, in the county of Cloud and State of Kansas, have invented a new and useful Shock-Loader, of which the following is a specification.

This invention has reference to improvements in shock loaders, and while not entirely confined thereto has more especial reference to the picker located at the front of the machine and designed to catch the shocks from the ground and lift them on to an elevator which, in turn, deposits them upon an apron to conduct them to a wagon upon which they are loaded.

The picker consists essentially of a cylinder upon which are located picker fingers or blades designed to catch the shock, lift it from the ground and throw it over on to the apron, the said picker blades being controllable to disengage from the shock prior to the deposition of the same upon the elevator apron and also being provided with means whereby, should the picker blades engage an obstruction, they will yield to said obstruction and no harm will come therefrom to the machine.

The invention will be more fully understood by reference to the following specification, taken in connection with the accompanying drawings, in which,—

Figure 1 is a plan view, with parts broken away, of the improved shock loader; Fig. 2 is a side elevation of the same; Fig. 3 is an enlarged sectional detail view of the picker showing one of the operating cams; Fig. 4 is a sectional view of the picker showing the action of the blades under the control of the cam; Figs. 5 and 6 are detail perspective views of the picker shaft and contiguous parts.

Referring to the drawings, there is shown a main frame 1 mounted near the rear upon the drive wheels 2 and near the front upon caster wheels 3. At the front of the machine the framework is continued laterally outward from each side member of the frame, as shown at 4, to which are attached the whiffletrees 5 connected one to the other through a chain or rope 6 passing around pulleys 7 mounted on the side bars of the frame at a point to the rear of the caster wheels. This draft equalizer is shown only tentatively and need not be further described.

The drive wheels 2 may each be provided with a one-way automatic clutch by which they are coupled to the axle 8, but as this clutch forms no part of the present invention it is not shown.

Upon the axle 8 is secured a gear wheel 9 meshing with a pinion 10 fast on a short counter-shaft 11 journaled in boxes 12 upon the framework parallel with the axle 8. One end of this shaft carries a sprocket wheel 13 and the other end a beveled pinion 14. The sprocket wheel 13 is coupled by means of a sprocket chain 15 to a sprocket wheel 16 upon a short shaft 17 carrying two other sprocket wheels 18—19. The sprocket wheel 18 is coupled by a sprocket chain 20 to a sprocket wheel 21 upon a shaft 22, which latter is extended across the framework near the front end thereof, being mounted in suitable bearings, and this shaft 22 is provided with suitable supports and driving means for a slat conveyer 23 extending to the forward end of the machine where it is provided with suitable supports mounted upon another shaft 24 extending across the machine contiguous to the picker there located and to be hereinafter described. The shaft 22 also carries a sprocket wheel 25 which, through a sprocket chain 26, conveys power to the picker in a manner to be hereinafter described.

Returning now to the shaft 16 receiving power from the drive wheels, the sprocket wheel 19 thereon is connected by a sprocket chain 27 to another sprocket wheel 28 mounted on a shaft 29 extending across an upwardly-extending portion of the framework and carrying supporting and propelling means for the lifting slat conveyer 30 which is designed to receive and elevate the shocks received on the conveyer 23 to the highest point of the machine.

Extending laterally across the rear of the machine upon the framework thereof and elevated to a point a little below the upper end of the conveyer 30 is a laterally-traveling slat conveyer 31 mounted at its two ends upon shafts 32—33 and driven by sprocket chains 34 engaging sprocket wheels 35. The shaft 33 has a sprocket wheel 35' driven by a sprocket chain 36 receiving motion from a sprocket wheel 37 on one end of a shaft 38 journaled in the lower rear portion of the frame 1 and carrying at its other end a beveled pinion 39 meshing with the pinion 14 before mentioned. The outer end 40 of the slat conveyer 31 is capable of having its extreme outer end adjusted through an arc by any appropriate means as through the side links 41, and take-up mechanism consisting of the sprocket wheel 42 on an arm 43 controlled by the spring 44 is provided for the sprocket chains 34.

The structure so far described is so formed that when the machine is drawn forward and the drive wheels 2 are rotated, the various conveyers are moved at proper rates of speed to carry the shocks received on the conveyer 23 up by the conveyer 30 to the conveyer 31, from whence they pass to the part 40 and fall from the outer end thereof upon a wagon suitably placed to receive them.

Coming, now, to the picker which is designed to lift the shocks from the ground and deposit them upon the first conveyer 23, this picker consists of a cylindrical body portion 45 fast upon a shaft 46 which extends across the front of the machine and is journaled in boxes 47 adjustable lengthwise in the front end of the frame of the machine. It will be observed that the bearings of the shaft 24 adjacent to this shaft 46 are also adjustable lengthwise in the front of the frame of the machine. Upon one end of the shaft 46 there is secured a sprocket wheel 48 receiving motion by the sprocket chain 26 before referred to. At diametrically opposite points near each end of the cylindrical body 45 there are journal bearings 49 for rock shafts 50 each carrying the picker fingers or blades 51, which may be of the general shape shown in the drawings or may be simply fingers. Upon each end of the rock shafts 50 is a collar 52 having on one side a lug 53 and this collar is made fast upon the shaft 50 in any suitable manner. Mounted upon each end of the shaft 50 between the collar 52 and the picker blades 51 is a sleeve 54 on one side of which is formed a projecting member 55 terminating in a stud 56 parallel with but removed a distance from the respective shaft 50. The lug 53 is provided with an aperture 57 and the member 55 is provided with a slot 58 in line with the aperture 57 for a purpose which will hereinafter appear.
Upon each stud 56 is journaled a roller 59 engaging in a cam groove 60 upon a fixed cam plate 61 fast on each side of the frame 1 at its front in position to be engaged by the rollers 59. This cam plate 61 may form part of the bearings of the shaft 46 and be adjustable therewith. The front half of the cam groove 60 is concentric with the axis of the shaft 46, while the rear half is made on a longer radius, so that when the roller 59 reaches this portion of the groove it will be drawn toward the shaft 46 in the manner clearly indicated in Fig. 3.

Secured to the lug 53 by being passed through the aperture 57 therein and riveted or otherwise secured to the said lug is a curved rod 62, the curvature being struck from the axis of the rock shaft 50. This rod passes through the slot 58 in the member 55 and is surrounded by a helical spring 63. This spring bears at one end against the member 55 and at the other end is adjustably held by a nut 64 screwed upon the threaded end of said rod 62. When the roller 59 is within the portion of the groove 60 concentric with the shaft 46 the blades 51 are held in a radial position projecting outwardly from the cylindrical body portion 45 of the picker. When the rollers reach the latter portion of the groove they are drawn toward the shaft 46 and the rock shafts 50 are rotated in their bearings to bring the blades 51 up to the cylindrical portion 45 of the picker.

Suppose, now, that one of the picker blades in passing near the ground should encounter an obstruction. The spring 63 will immediately yield and allow the blade to trail over the obstruction without harm to any portion of the structure. This is an important feature of my invention and enables me to use the machine without danger where otherwise it might become irreparably injured.

I claim:—

1. In a shock loader, a picker comprising a rotary member, rock shafts mounted thereon and provided with picker blades or fingers, sleeves mounted upon said rock shafts, rollers carried upon said sleeves eccentrically to the axes thereof, stationary cams engaging said rollers, and elastic connections between the rock shafts and the roller-carrying sleeves.

2. In a shock loader, a picker comprising a rotary member, rock shafts carried thereby, picker blades or fingers on said rock shafts, sleeves carried by said rock shafts and having rollers journaled eccentrically thereon, fixed cams engaging said rollers, and adjustable spring connections between said sleeves and rock shafts.

3. In a shock loader, a picker comprising a rotary member, rock shafts carried by and journaled on the same, picker fingers or blades carried by said rock shafts, sleeves upon said rock shafts, rollers carried by said sleeves eccentrically to the axes of the latter, stationary cams engaging said rollers, arms projecting from said rock shafts adjacent to the projecting portions of said sleeves, and spring connections for coupling the respective sleeves and rock shafts together.

In testimony that I claim the foregoing as my own, I have hereto affixed my signature in the presence of two witnesses.

WILFRID PELTIER.

Witnesses:
A. D. REID,
E. J. MESSALL.